US012650334B2

(12) United States Patent
Cai et al.

(10) Patent No.: US 12,650,334 B2
(45) Date of Patent: Jun. 9, 2026

(54) MULTI-SPAN DISTRIBUTED ACOUSTIC SENSING FROM THE SHORE WITH DIFFERENT SENSING FREQUENCY RANGES AND SENSING SPAN LENGTHS

(71) Applicant: SUBCOM, LLC, Eatontown, NJ (US)

(72) Inventors: Jin-Xing Cai, Morganville, NJ (US); Alexei N. Pilipetskii, Long Branch, NJ (US); William W. Patterson, Freehold, NJ (US); Carl R. Davidson, Warren, NJ (US); Georg Heinrich Mohs, East Brunswick, NJ (US); Sonali Banerjee, Morganville, NJ (US); Lara Denise Garrett, Red Bank, NJ (US)

(73) Assignee: SubCom, LLC, Eatontown, NJ (US)

( * ) Notice: Subject to any disclaimer, the term of this patent is extended or adjusted under 35 U.S.C. 154(b) by 416 days.

(21) Appl. No.: 18/498,231

(22) Filed: Oct. 31, 2023

(65) Prior Publication Data

US 2025/0137838 A1 May 1, 2025

(51) Int. Cl.
*G01H 9/00* (2006.01)

(52) U.S. Cl.
CPC .................................... *G01H 9/004* (2013.01)

(58) Field of Classification Search
None
See application file for complete search history.

(56) References Cited

U.S. PATENT DOCUMENTS

| | | | | |
|---|---|---|---|---|
| 10,727,815 | B2 * | 7/2020 | Segovia Fernandez | . H03B 5/32 |
| 11,366,244 | B2 * | 6/2022 | Barfoot | ................... E21B 49/00 |

(Continued)

FOREIGN PATENT DOCUMENTS

| | | |
|---|---|---|
| EP | 4020847 A1 | 6/2022 |
| EP | 4106227 A1 | 12/2022 |
| EP | 4160941 A1 | 4/2023 |

OTHER PUBLICATIONS

Bian et al., "Vibration measurement technique for repeated fiber-optic hydrophone transmission cable system," In: Proceedings of Society of Photo-Optical Instrumentation Engineers (SPIE), vol. 11554, Advanced Sensor Systems and Applications X, 115541C (Oct. 10, 2020)—Abstract.

(Continued)

*Primary Examiner* — Peter J Macchiarolo
*Assistant Examiner* — Jermaine L Jenkins
(74) *Attorney, Agent, or Firm* — KDW Firm PLLC

(57) ABSTRACT
A system may include a first DAS station, comprising a first plurality of interrogator units to launch a first plurality of DAS signals in a first direction, wherein a first interrogator unit is configured to launch a first DAS signal at a first interrogation rate and first wavelength, wherein a second interrogator unit is configured to launch a second DAS signal at a second wavelength and second interrogation rate, less than the first interrogation rate. The system may include a loopback array, comprising a plurality of loopbacks, arranged over a plurality of spans, wherein a first set of proximate loopbacks nearest to the first DAS station are configured to route back the first DAS signal to the first DAS station, and wherein a first set of intermediate loopbacks, located further from the first DAS station, are configured to route back the second DAS signal to the first DAS station.

20 Claims, 5 Drawing Sheets

(56) References Cited

U.S. PATENT DOCUMENTS

| | | | |
|---|---|---|---|
| 12,203,892 B1 * | 1/2025 | Findikoglu | ............ G01N 29/14 |
| 2016/0169768 A1 | 6/2016 | Handerek | |
| 2019/0229803 A1 | 7/2019 | Xu | |
| 2022/0397448 A1 | 12/2022 | Pilipetskii | |
| 2023/0095884 A1 | 3/2023 | Ellmauthaler | |
| 2024/0027259 A1 | 1/2024 | Cai | |

OTHER PUBLICATIONS

Document No. SEAFOM—Measuring Sensor Performance Document—02 (SEAFOM MSP-02) DAS Parameter Definitions and Tests issue date: Aug. 2018, https://seafom.com/published-documents/.
European Search Report for EP Application No. 23186359.8, dated Nov. 27, 2023, 9 pages.
M.E. Formann et al., "Nonlinear amplifying loop mirror," Opt. Lett. 15, 752-754 (1990).
Muhammad I. M. Abdul Khudus et al., "phase matched parametric amplification via four-wave mixing in optical microfibers," Opt. Lett. 41, 761-764 (2016).
SEAFOM DAS (MSP-02), "Document No. SEAFOM Measuring Sensor Performance Document," DAS Parameter Definitions and Tests, V2.0: 63 pages (Feb. 2024).
European Search Report for EP Application No. 24209130.4, dated Mar. 27, 2025, 9 pages.

* cited by examiner

*100*

*100*

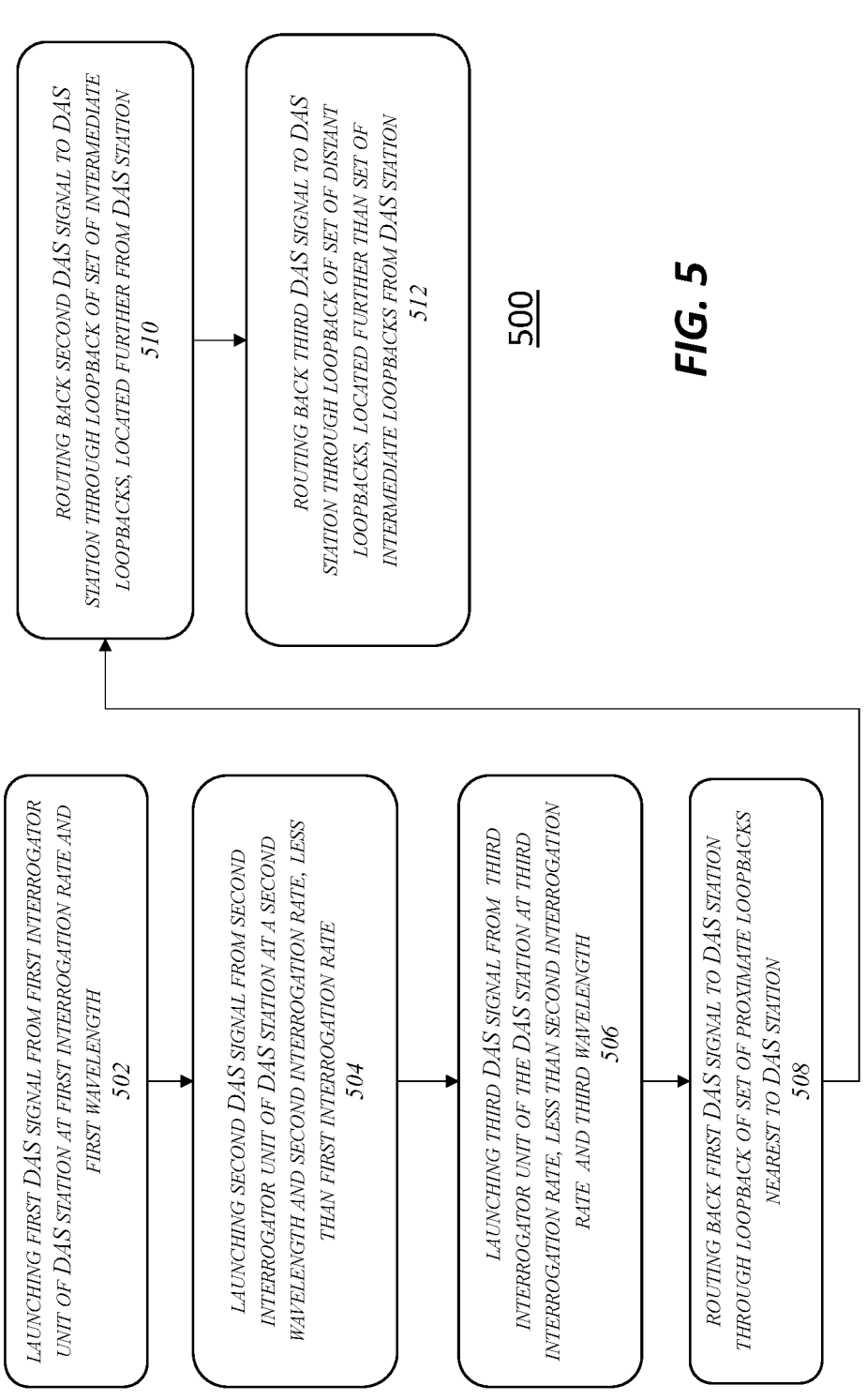

LAUNCHING FIRST DAS SIGNAL FROM FIRST INTERROGATOR UNIT OF DAS STATION AT FIRST INTERROGATION RATE AND FIRST WAVELENGTH
502

LAUNCHING SECOND DAS SIGNAL FROM SECOND INTERROGATOR UNIT OF DAS STATION AT A SECOND WAVELENGTH AND SECOND INTERROGATION RATE, LESS THAN FIRST INTERROGATION RATE
504

LAUNCHING THIRD DAS SIGNAL FROM THIRD INTERROGATOR UNIT OF THE DAS STATION AT THIRD INTERROGATION RATE, LESS THAN SECOND INTERROGATION RATE AND THIRD WAVELENGTH
506

ROUTING BACK FIRST DAS SIGNAL TO DAS STATION THROUGH LOOPBACK OF SET OF PROXIMATE LOOPBACKS NEAREST TO DAS STATION
508

ROUTING BACK SECOND DAS SIGNAL TO DAS STATION THROUGH LOOPBACK OF SET OF INTERMEDIATE LOOPBACKS, LOCATED FURTHER FROM DAS STATION
510

ROUTING BACK THIRD DAS SIGNAL TO DAS STATION THROUGH LOOPBACK OF SET OF DISTANT LOOPBACKS, LOCATED FURTHER THAN SET OF INTERMEDIATE LOOPBACKS FROM DAS STATION
512

MULTI-SPAN DISTRIBUTED ACOUSTIC SENSING FROM THE SHORE WITH DIFFERENT SENSING FREQUENCY RANGES AND SENSING SPAN LENGTHS

FIELD

Embodiments of the present disclosure relate to the field of optical communication systems. In particular, the present disclosure relates to techniques for extending and improving the sensitivity of distributed acoustic sensing (DAS) in subsea optical cables.

DISCUSSION OF RELATED ART

In a distributed acoustic sensing (DAS) system, an optical cable may be used to provide continuous real-time or near real-time monitoring of perturbances or anomalies in the vicinity of the fiber optic cable (hereinafter cable), and up to many kilometers from the cable. In other words, the cable itself may be used as a distributed sensing element to detect or monitor different types of disruptions, interferences, irregularities, activities whether natural or man-made occurring in or out of the undersea environment, etc. as acoustic vibrations in the DAS sensing environment (e.g., oceanic and terrestrial environment). To do so, optoelectronic devices/equipment coupled to the cable of the DAS system may detect, and process reflected light signals (e.g., Rayleigh backscatter signals or simply Rayleigh signal) over a distance (range) in the DAS sensing environment.

Generally, a DAS system may include a cable station equipped with a DAS Interrogator Unit (IU) that typically includes a DAS transmitter and receiver to probe a fiber optic cable using a coherent laser pulse, where changes in the phase of the returning optical backscattered signal are measured. Optical phase shift between the received backscattered pulses may be proportional to strain in the fiber, leading to the ability to detect vibrations and the like, as measured by the effect of such perturbations on the phase. For example, a DAS system based on Rayleigh back scattering also referred to as a Rayleigh-scattering-based DAS system in prior art.

To date, the capability of DAS IUs have been limited to cable lengths in the range of approximately 50 km for practical technology, and up to 150 km in experimental research units. Therefore, in a repeatered system that is equipped with Erbium doped fiber amplifiers (EDFA), just the first cable span (or span hereinafter) that is adjacent to the DAS IU can be sensed. In order to sense an entire subsea cable link, where the link may span across a body of water to opposite shores, in one approach DAS IUs may be placed in each optical repeater of the subsea link, where the sensing data collected would need to be transmitted to either shore end across the same optical cable that carries commercial optical signals.

Another approach for DAS sensing is to make measurements through multiple amplified spans from a single DAS IU located on shore. However, to sense a long subsea link (up to 10,000 km, for example) using just one DAS IU on either shore end of the system (similar to the Coherent Optical Time Domain Reflectometry (C-OTDR) or Line Monitoring Equipment-Optical Time Domain Reflectometry (LME-OTDR) measurements deployed in some current commercial systems) will significantly reduce the sensitivity of DAS signal detection, and therefore significantly lower the maximum detectable frequency range due to the lower interrogation rate.

It is with reference to these, and other considerations, that the present disclosure is provided.

BRIEF SUMMARY

In one embodiment, a system for distributed acoustic sensing system is provided. The system may include a first distributed acoustic sensing (DAS) station, comprising a first plurality of interrogator units to launch a first plurality of DAS signals in a first direction. As such, a first interrogator unit of the first DAS station may be configured to launch a first DAS signal at a first interrogation rate and a first wavelength, wherein a second interrogator unit of the first DAS station is configured to launch a second DAS signal at a second wavelength and a second interrogation rate, that is less than the first interrogation rate. The system may include a loopback array, comprising a plurality of loopbacks, arranged over a plurality of spans, wherein a first set of proximate loopbacks nearest to the first DAS station are configured to route back the first DAS signal to the first DAS station, and wherein a first set of intermediate loopbacks, located further from the first DAS station, are configured to route back the second DAS signal to the first DAS station.

In another embodiment, a system for distributed acoustic sensing is provided. The system may include a first distributed acoustic sensing (DAS) station, located at a first end of a multi-span link, and configured to launch a plurality of DAS signals in a first direction. The system may include a second distributed acoustic sensing (DAS) station, located at a second end of the multi-span link, and configured to launch a plurality of DAS signals in a second direction. The system may include a loopback array, comprising a first set of proximate loopbacks, located nearest to the first DAS station; a first set of intermediate loopbacks; a second set of proximate loopbacks, located nearest to the second DAS station; and a second set of intermediate loopbacks, located closer to the second DAS station than the first set of intermediate loopbacks. As such, a first wavelength and a first interrogation rate of a first set of DAS signals routed through the first set of proximate loopbacks may differ from a second wavelength and a second interrogation rate of a second set of DAS signals routed through the first set of intermediate loopbacks, and wherein a third wavelength and a third interrogation rate of a third set of DAS signals routed through the second set of proximate loopbacks differs from a fourth wavelength and a fourth interrogation rate of a fourth set of DAS signals routed through the second set of intermediate loopbacks.

In another embodiment, a method for distributed acoustic sensing may include launching a first DAS signal from a first interrogator unit of a first DAS station at a first interrogation rate and a first wavelength and launching a second DAS signal from a second interrogator unit of the first DAS station at a second wavelength and a second interrogation rate, less than the first interrogation rate. The method may include routing back the first DAS signal to the first DAS station through a loopback of a first set of proximate loopbacks nearest to the first DAS station, and routing back the second DAS signal to the first DAS station through a loopback of a first set of intermediate loopbacks, located further from the first DAS station.

BRIEF DESCRIPTION OF THE DRAWINGS

FIG. 5 depicts an exemplary process flow for operating a DAS system.

DESCRIPTION OF EMBODIMENTS

Figure 1:
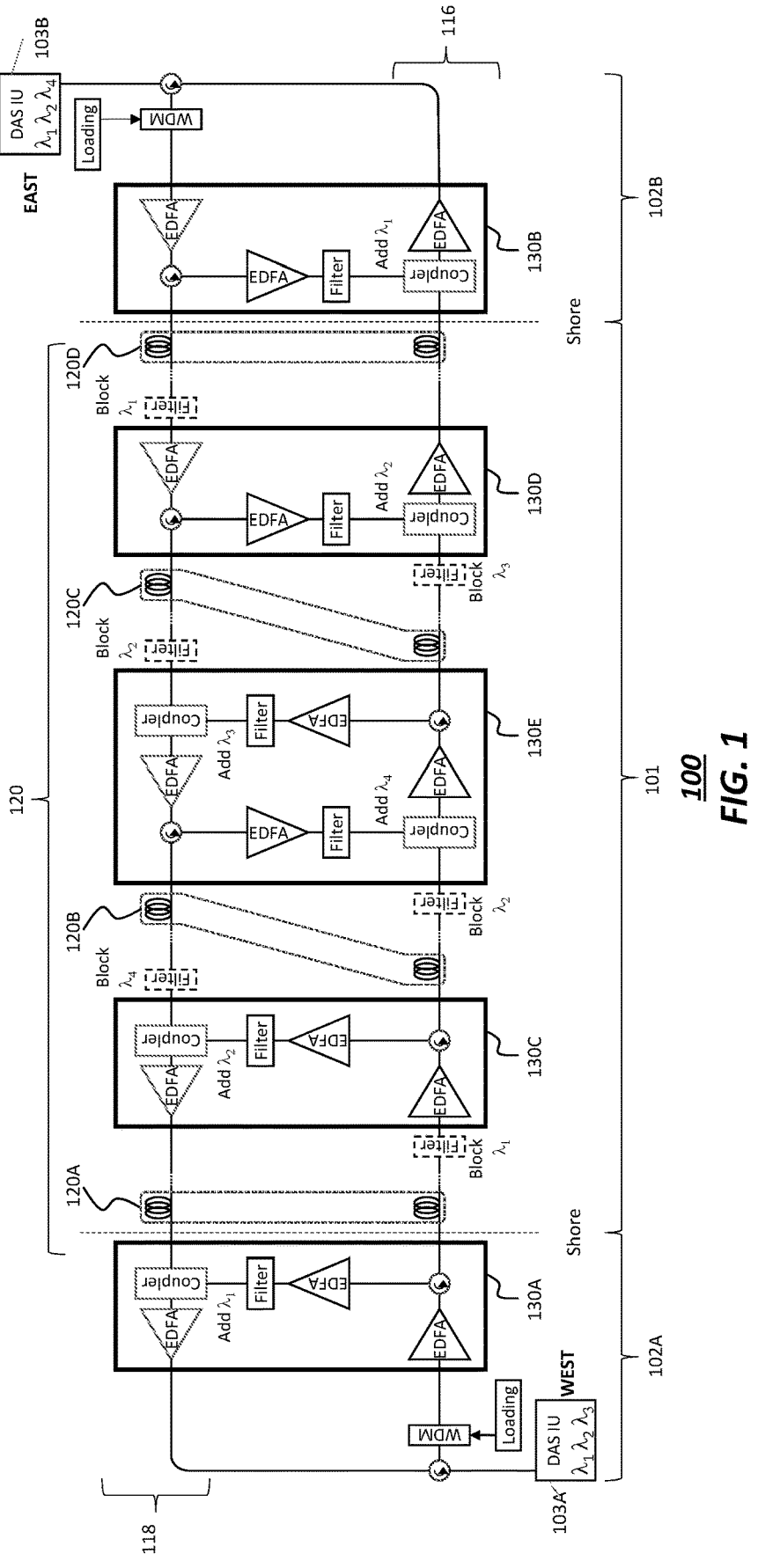
FIG. 1 illustrates an example of a DAS system, according to embodiments of the disclosure.

The present embodiments will now be described more fully hereinafter with reference to the accompanying drawing figures, in which exemplary embodiments are shown. The scope of the embodiments should not be construed as limited to the embodiments set forth herein. Rather, these embodiments are provided so that this disclosure will be thorough and complete, and will fully convey the scope of the embodiments to those skilled in the art. In the drawings, like numbers refer to like elements throughout.

Before detailing specific embodiments with respect to the figures, general features with respect to the embodiments will be reviewed. Novel DAS apparatus, systems, architecture, and techniques are provided to improve DAS sensing capability, in particular, sensitivity and range across multiple spans of a subsea system including above ground and underground optical cables.

The present embodiments provide architecture and methods for DAS sensing that may tailor the monitoring of different activities or events according to location over a large range up to thousands of kilometers in a subsea environment. By way of an example, in a subsea sensing system, there are different activities that may take place in the vicinity or along the length of a cable that may be detected and monitored, resulting in different measured acoustic frequencies or frequency signatures. Close to the shore (e.g., <100 km away), there are many activities related to humans, animals, ships, and other sources, where the suitable frequency response range may be up to several kHz. In the intermediate range (e.g., 100 km-500 km away from shore), ship activity may be the most important events to be monitored. For monitoring of activity in this distance range, detection of 100 Hz frequency response may be especially suitable, since most of the acoustic signals from commercial ships are generated at frequencies below 100 Hz. For deep ocean locations, (e.g., >500 km away from shore), the primary acoustic signals are from earthquakes, tsunamis, and underwater land movement, where lower frequency range down to sub-Hz frequency response range is sufficient to capture these natural events. Accordingly, the present embodiments tailor DAS sensing along a multi-span subsea cable system based upon the span location.

FIG. 1 illustrates an example of a DAS system, shown as system 100, according to embodiments of the disclosure. The system 100 is formed of two terminal DAS cable stations (a cable station equipped with DAS Interrogator Unit or a DAS station hereinafter) that may be located at opposite ends of—a subsea cable system, where a first DAS station is shown as DAS station 102A with DAS IU 103A, and a second DAS station is shown as DAS station 102B with DAS IU 103B, where each DAS station may be located on shore. Each of the DAS stations may include a plurality of interrogator units (IUs) that are designed to independently launch DAS signals at different wavelengths. By way of example, when two IUs are deployed from each end of a cable system, the IU wavelengths are designated as $\lambda1$, $\lambda2$ at one station and $\lambda3$, $\lambda4$ at the 2nd station. When three IUs are deployed from each end of a cable system, the IU wavelengths are designated as $\lambda1$, $\lambda2$, $\lambda5$ at one station and $\lambda3$, $\lambda4$, $\lambda6$ at the 2nd station. In particular embodiments, for the interrogation of certain spans, the wavelengths sent from the first DAS cable station may be the same as the wavelengths sent from the second DAS cable station (as explained later); for example in the specific example of FIG. 1, only 4 different wavelengths are needed to interrogate the entirety of the spans between the first and second DAS station ($\lambda1=\lambda3$, $\lambda2=\lambda4$, $\lambda5$, $\lambda6$), where the 4 different wavelengths are allotted as $\lambda1$, $\lambda2$, $\lambda3$ at one station and $\lambda1$, $\lambda2$, $\lambda4$ at the 2nd station as shown in FIG. 1.

The separate IUs are represented in FIG. 1 by the different wavelengths, $\lambda1$, $\lambda2$ and $\lambda3$ in the case of DAS station 102A, and $\lambda1$, $\lambda2$ and $\lambda4$, in the case of DAS station 102B. The two DAS stations may connect to a single fiber pair of a cable, where one fiber of the fiber pair may be designed to transmit DAS signals on a path 116, from 'west' to 'east' in FIG. 1, while the other fiber of the fiber pair may transmit DAS signals from east to west along path 118.

As discussed below, the different DAS stations of the system 100 may transmit on an optimized number of monitoring wavelengths, so that together the entire subsea link can be monitored. In one aspect of the present embodiments, to avoid or limit the Optical Signal to Noise Ratio (OSNR) penalty arising from fiber-nonlinearity, the DAS pulses from the three DAS IUs may be synchronized and staggered in time.

As depicted in FIG. 1, the link 101 between the DAS station 102A and DAS station 102B is characterized by a series of cable spans, shown as span 120A, span 120B, span 120C, and span 120D, and repeaters, shown as repeater 130A, repeater 130C, remote repeater 130E, repeater 130D and repeater 130B. By way of example, a single example of a repeater 130A and repeater 130B is shown in FIG. 1, but there may be a plurality of the 130A-style and 130B-style repeaters after the shore spans. Repeater 130A and repeater 130B may be located, for example, at a distance of no more than 100 km or so from the respective shores that house the DAS IU 103A and DAS IU 103B, for example. After the DAS IU 103A and DAS IU 103B style repeaters, a $\lambda_1$ blocking filter will be present. Only the span after furthest of the repeaters 130A from the DAS IU 103A and the span after the furthest of the repeaters 130B from the DAS IU 103B will be followed by A blocking filters. The link 101 further includes intermediate repeaters 130C and repeater 130D and their associated optical spans, span 120B and span 120C, where these intermediate repeaters and optical spans may be located in the range of few hundreds of kms (e.g., 100 km to 500 km) from shore according to various non-limiting embodiments. At either end of the system, several 130C-style and 130D-style repeaters and spans may be employed. Only the furthest of span 120B from the DAS IU 103A and the furthest of spans 120D from the DAS IU 103B are followed by the $\lambda_2$ blocking filters. The link 101 may further include a set of remote repeaters 130E and associated spans, which cover a range that is more remote than 500 km from each shore that houses the DAS IUs 103A and DAS IU 103B. The remote repeaters 130E and associated spans may cover a range that extends up to several thousand kms (e.g., 9,000 km) in one example. This section of 130E-style repeaters and spans have $\lambda_3$ $_{and}$ $\lambda_4$ blocking filters positioned as shown in FIG. 1. As illustrated in the particular embodiment of FIG. 1, just one each of the $\lambda_3$ and $\lambda_4$ blocking filters

5 is provided, and these blocking filters are located at each end of the section of remote repeaters 130E and spans.

Note that subsea repeaters may be located along the system 100, which repeaters define the boundaries of spans, as noted. Located at a given repeater may be a loopback path shown in bold lines in drawing FIG. 2, where the hardware associated with a repeater and loopback path may be referred to herein as a "loopback." These loopbacks include a first set of proximate loopbacks nearest to the DAS station 102A, which loopbacks may coincide with the repeaters 130A; a first set of intermediate loopbacks, which loopbacks may coincide with the repeaters 130C, located further from the DAS station 102A; a set of distant loopbacks, shown which may coincide with remote repeaters 130E, located further from the DAS station 102A than loopbacks associated the repeaters 130C; a second set of proximate loopbacks, coinciding with the repeaters 130B, nearest to the DAS station 102B; and a second set of intermediate loopbacks, coinciding with the loopbacks associated with repeaters 130D, located between the loopbacks associated with remote repeaters 130E and loopbacks associated with the repeaters 130B.

In various embodiments, these loopbacks may be deployed with multiple designs. By way of example and not as a limitation, in the embodiment shown in FIG. 2, the loopback comprises a circulator, an erbium-doped fiber amplifier (EDFA to amplify the Rayleigh signal), and an optical add-drop multiplexer (OADM) filter. In an alternative embodiment, the same function may be implemented using a combination of other hardware, e.g. a passive coupler and an optical filter. Compared to traditional high loss loopback (HLLB) path deployed in a conventional amplified path, we refer to this type of loopback as filtered and amplified loopback (FALB). As detailed below, such filtering components may function to pass only the sensing wavelength sent from a DAS cable station in a first direction that is associated with a given loopback. The reflected Rayleigh signal at the given wavelength is then added in the given loopback to the return DAS signal that is sent back to the cable station for detection.

As such, a given loopback needs to amplify and filter only the back-reflected Rayleigh signal corresponding to the wavelength of a given IU of the DAS station, so that the return signal amplitude is suitable for maintaining the output powers of amplifiers at the design power level in the return path.

Returning to FIG. 1, the loopbacks associated with repeaters 130A may be designed to filter and return Rayleigh signals corresponding to a DAS signal launched from an IU of DAS station 102A at wavelength λ1. The same may apply to loopbacks associated with the repeaters 130B with respect to a DAS signal launched from DAS station 102B. The loopbacks associated with the repeaters 130C may be designed to filter and return Rayleigh signals corresponding to a DAS signal launched from an IU of DAS station 102A at wavelength λ2, which wavelength differs from wavelength λ1. The same may apply to loopbacks associated with the repeaters 130D with respect to a DAS signal launched from DAS station 102B.

Figure 4:
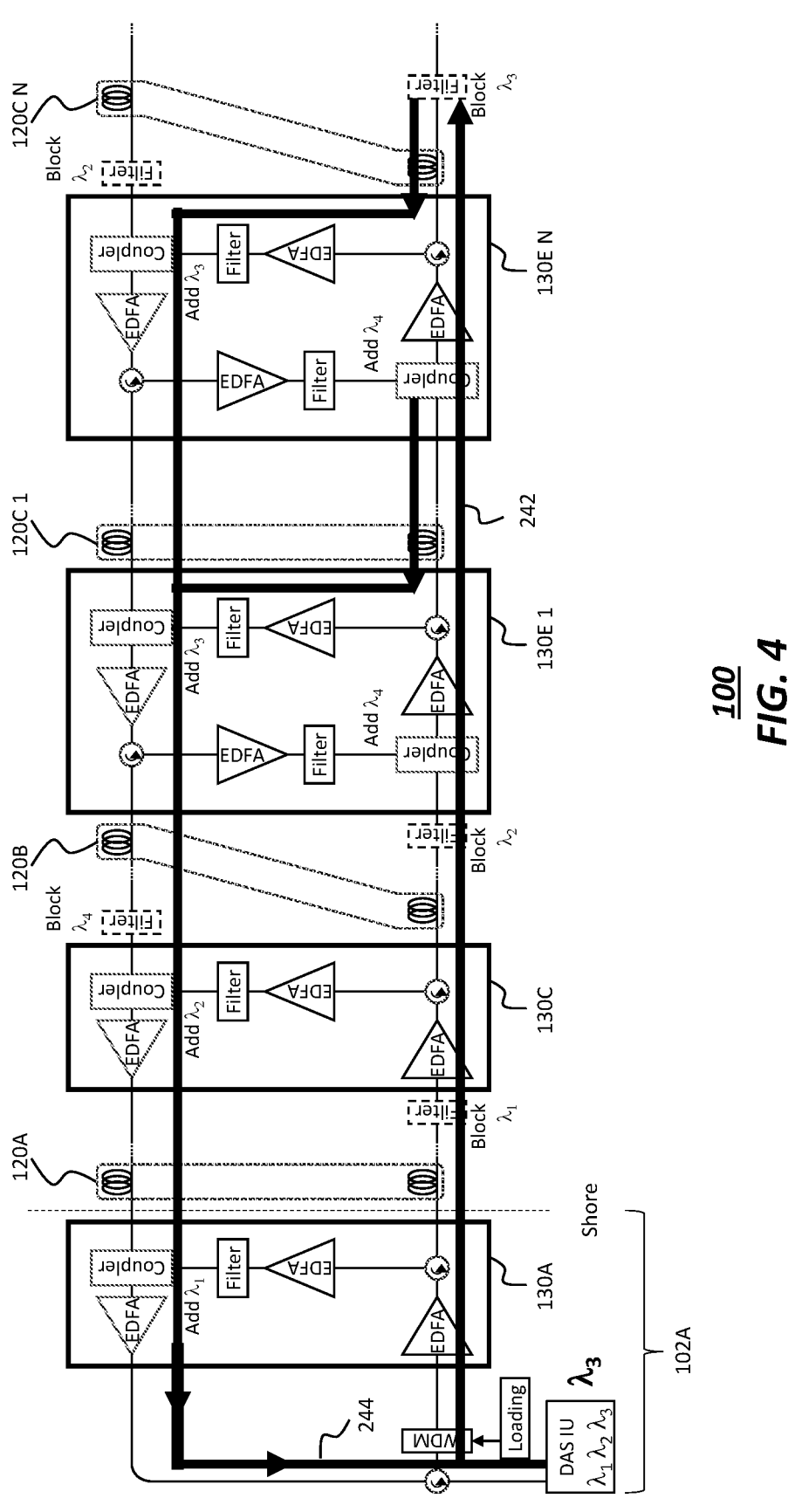
FIG. 4 illustrates a further exemplary mode for operating the DAS system of FIG. 1, according to embodiments of the disclosure.

Regarding loopbacks associated with remote repeaters 130E, as detailed with respect to FIG. 4 in particular, these loopbacks may be arranged to be bi-directional loopbacks, to receive and loopback DAS signals transmitted from both DAS station 102A and DAS station 102B. According to various embodiments of the disclosure the wavelength treated by loopbacks associated with repeaters 130A and loopbacks associated with repeaters 130B may (but need not) be the same as one another (shown in FIG. 1 as λ1), while the wavelength treated by loopbacks associated with repeaters 130C and loopbacks associated with repeaters 130D may (but need not) be the same as one another (shown in FIG. 1 as λ2).

Note that in accordance with embodiments of the disclosure, an outbound DAS IU forward-sensing signal sent from DAS station 102A or from DAS station 102B is pulsed in time, while the return back-reflected signal (such as a Rayleigh signal) is quasi-continuous along the cable span length of the link shown in FIG. 1. Therefore, the peak power of the backscattered signal that is directed into a given loopback path is much lower than the peak power of the forward sensing signal.

According to various embodiments of the disclosure, in the configuration of FIG. 1, multiple spans (i.e., cable length between amplifiers) can be measured using a single outbound DAS signal launched from an IU at a chosen wavelength (e.g., λ2) so that a sensing channel can be added back in the return (inbound) direction of the fiber pair from the Rayleigh signals received from multiple spans. Note that these different signals from different spans may be returned as pulses over the same channel (wavelength) of the given fiber used to carry return DAS signals to a given DAS station. Thus, in order to avoid pulse overlap of signals returning from different spans over the same channel, the pulse width of a DAS sensing pulse may be set to be much smaller than the pulse travelling time in the shortest span and the pulse period is larger than the sum of the pulse width and the pulse travelling time in the longest span so that the returned Rayleigh signal is quasi-continuous and the DAS data can be properly detected for any given span.

By way of example and not as a limitation, Table I, summarizes exemplary sensing parameters for one non-limiting embodiment of the disclosure where three DAS IUs are provided at each of the DAS station 102A and DAS station 102B, in order to provide pulsed DAS signals at different wavelengths that are associated with a given sensing range to be probed. In this example, sensing capability is provided over a link that extends for a total of 10,000 km between DAS station 102A and DAS station 102B.

TABLE I

|  | Sensing Distance [km] | Sensing Frequency [Hz] | Interrogation Rate [Hz] | Span Length [km] |
|---|---|---|---|---|
| λ1 | 0-100 (see spans 120A, 120D) | 500 | 1000 | 50 |
| λ2 | 100-500 (see spans 120B and 120C) | 100 | 200 | 50 |
| λ3, λ4 | 500-9500 (see repeaters 130E) | 5 | 10 | 100 |

Figure 2:
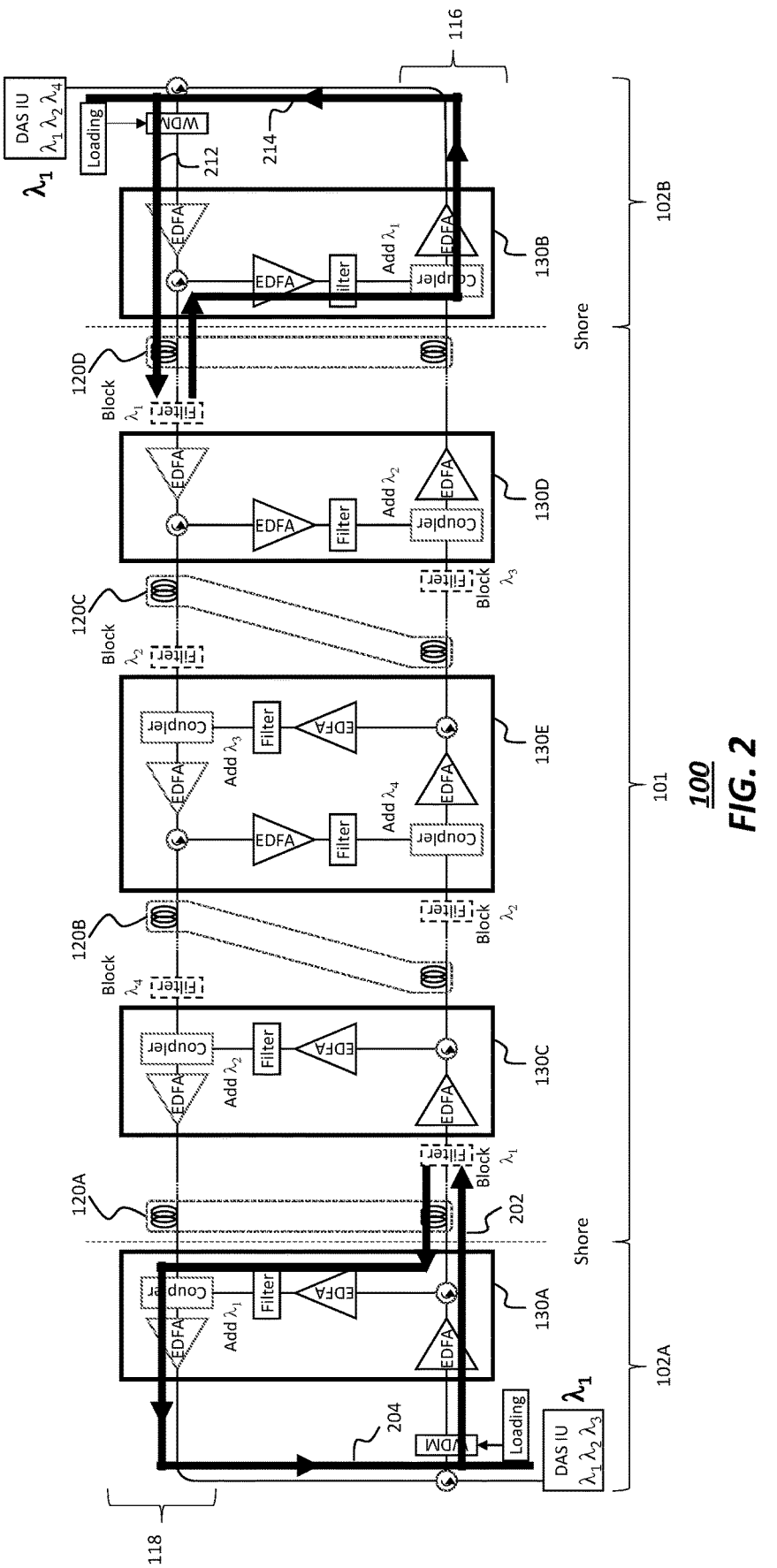
FIG. 2 illustrates one exemplary mode for operating the DAS system of FIG. 1, according to embodiments of the disclosure.

FIG. 2 illustrates one scenario for operating the system 100 of FIG. 1, according to embodiments of the disclosure. In this case, a set of DAS signals are launched from DAS stations 102A and DAS station 102B. FIG. 2 in particular shows in bold lines, the system optical signal flow for outbound and inbound fibers to perform DAS sensing of the shore spans, meaning the spans 120A and spans 120D, which spans may lie within 100 km of the opposing shores, represented by DAS station 102A and DAS station 102B.

As an example, the DAS station 102A launches a first DAS signal 202 from a first IU at a first interrogation rate and wavelength λ$_1$, for which an exemplary set of parameters may be specified from Table I. This wavelength may be used to probe acoustic disturbances over a range of 100 km from shore, for example. Since the sensing range is 100 km, according to different embodiments, this segment can be divided into one (100-km-repeater spacing) or two (50-km repeater-spacing) sensing spans. Thus, the loopback associated with repeaters 130A may generally represent one or two different loopbacks in different embodiments. As illustrated, the loopback associated with repeaters 130A (including circulator, EDFA and filter or OADM) is needed just for one direction (i.e., inbound to the closest shore, represented by DAS station 102A), to provide a return DAS signal 204 that provides DAS information from a sensing range within 100 km of shore. In this manner, the system cost of system 100 is lowered with respect to systems that may require bi-directional loopbacks in a given repeater, each requiring a circulator, EDFA and filter or OADM.

Note that the DAS station 102B may function similarly to DAS station 102A to launch a second DAS signal 212 and monitor a return signal 214 in order to probe DAS information from a sensing range of 100 km from the shore of DAS station 102B. Note that the wavelength and interrogation rate for second DAS signal 212 may (but need not) be the same as the wavelength and interrogation rate of first DAS signal 202, thus lowering system complexity. In operation, according to the scenario of FIG. 2, the sensing wavelength of the given outbound DAS signal (first DAS signal 202 or second DAS signal 212) may be blocked from the outbound fiber of the system 100 at the end of 100 km span length in order to boost the power of the remaining sensing wavelengths and prevent interference at the opposite end. In other words, the first DAS signal 202 is dropped at the furthest loopback from DAS station 102A of loopbacks associated with repeaters 130A, and the second DAS signal 212 is blocked at the furthest loopback from DAS station 102B of the loopbacks associated with the repeaters 130B.

Figure 3:
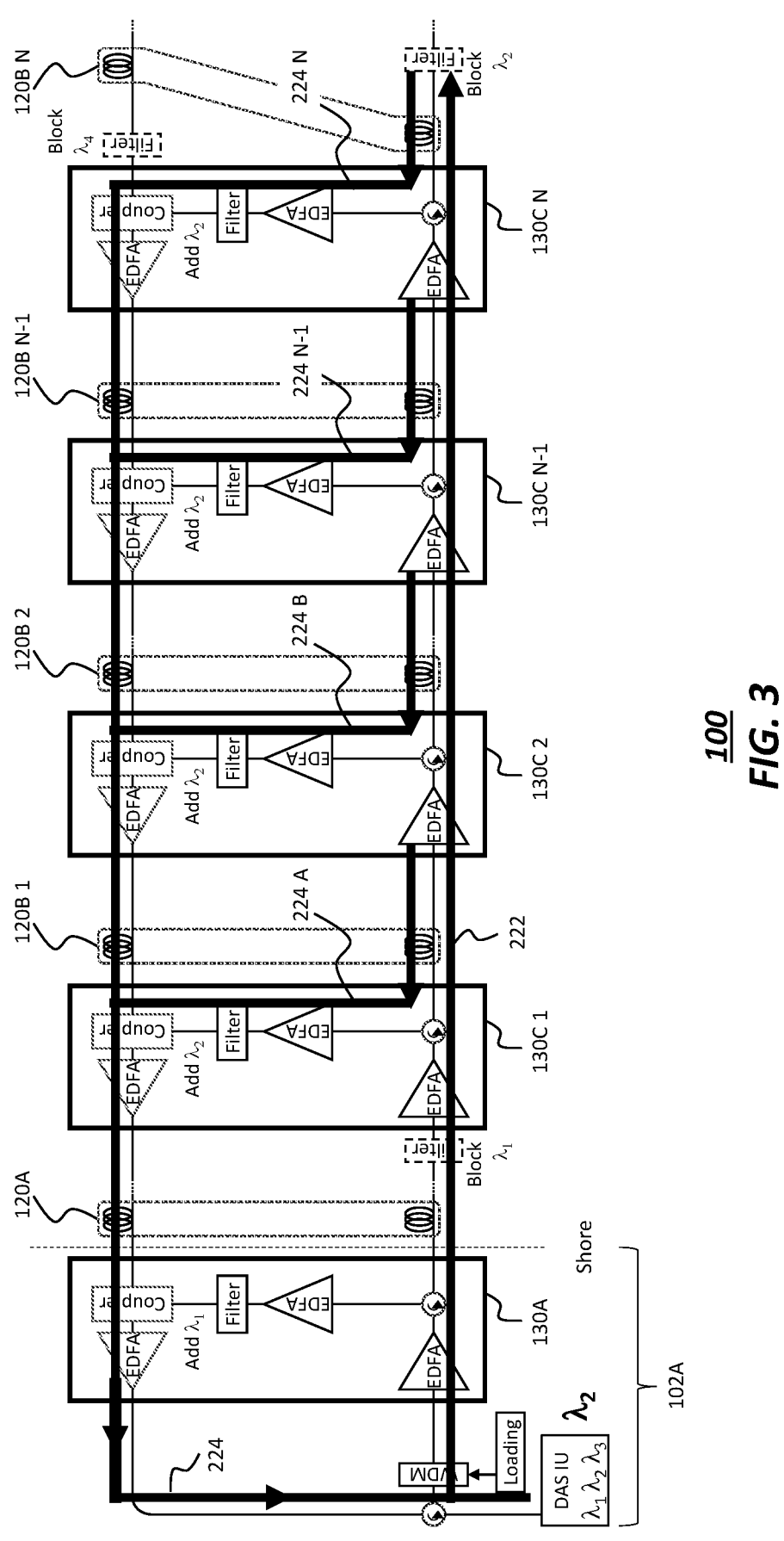
FIG. 3 illustrates another exemplary mode for operating the DAS system of FIG. 1, according to embodiments of the disclosure.

FIG. 3 illustrates another scenario for operating the DAS system of FIG. 1, according to embodiments of the disclosure. Only the west part of the system is shown. The eastern part behaves in a similar manner. In this case, another set of DAS signals are launched from DAS station 102A. FIG. 3 in particular shows the system optical signal flow through outbound and inbound fibers for performing DAS sensing of the intermediate spans, meaning the spans 120C and spans 120D (see also FIG. 1), which spans may lie for example, between 100 km to 500 km from the shore of the DAS station 102A or DAS station 102B, respectively.

As an example, the DAS station 102A launches another DAS signal, shown as DAS signal 222, from a second IU at a second interrogation rate and wavelength 22, for which an exemplary set of parameters may be specified from Table I. This wavelength will differ from λ1 and may be used to probe acoustic disturbances over a range of 100 km to 500 km from shore, for example. The interrogation rate of the DAS signal 222 will be less than the interrogation rate of first DAS signal 202, as shown in table 1, e.g., 200 Hz, with a maximum sensing frequency of 100 Hz. The individual loopbacks within the loopback array corresponding to repeaters 130C (also referred to as 130C-loopback array) are shown as loopback '130C 1' to '130C N' (each loopback of which may coincide with a corresponding repeater, and may be separated from one another by a span 120B 1-120B N), and since the sensing range may be from 100 km to 500 km, the loopbacks within the 130C-loopback array can be divided into 4 (100-km-repeater spacing) to 8 (50-km repeater spacing) sensing spans.

Again, an individual loopback of loopback within the 130 loopback array may be unidirectional (including circulator, EDFA and filter or OADM) since these spans are meant to be covered just by DAS station 102A and thus, loopback is again needed for just one direction (i.e., return direction to the shore of DAS station 102A), thus lowering the system cost.

Note that the return DAS signal 224, routed back to the DAS station 102A, may be divided into a series of return signals that are routed through a series of loopbacks of the 130C-loopback array. These return signals are shown as DAS signal '224 A' to DAS signal '224 N', and are routed through loopbacks '130C 1' to loopback '130C N', respectively. Thus, in the scenario of FIG. 3, the region associated with multiple spans covering a distance of 100 km to 500 km from shore can be measured with a single outbound DAS IU wavelength, λ2, so that a sensing channel corresponding to λ2 can be added back in the inbound direction (toward DAS station 102A) of the fiber pair from the Rayleigh reflections received at loopbacks arranged across up to eight spans. Note again that the width of the sensing pulse, DAS signal 222 needs to be much smaller than the pulse travelling time in the shortest span and the pulse period is larger than the sum of the pulse width and the pulse travelling time in the longest span.

FIG. 4 illustrates a further scenario for operating the system 100 of FIG. 1, according to embodiments of the disclosure. Only the west part of the system is shown. The eastern part behaves in a similar manner. In this scenario the optical signal flow for sensing in the deep ocean environment is depicted. As such, a set of loopbacks are depicted, corresponding to the loopbacks associated with remote repeaters 130E, discussed above. In particular, a loopback 130E1 and loopback 130EN are depicted, where loopbacks may represent loopbacks arranged at opposite ends of the spans associated with a first repeater 130E 1 and a last repeater 130E N of the remote repeaters 130E, for purposes of illustration. As noted, the sensing range covered by this set of loopbacks may be up to 9,000 km.

In this case, another set of DAS signals are launched from DAS station 102A as well as DAS station 102B, at different wavelengths than in the embodiments of FIG. 2 and FIG. 3. As an example, the DAS station 102A launches another DAS signal, shown as DAS signal 242, from a third IU at a third interrogation rate and wavelength λ3, for which an exemplary set of parameters may be selected from Table I. This wavelength will differ from λ1 and λ2 and may be used to probe acoustic disturbances over a range of 500 km from shore of DAS station 102A to 500 km from DAS station 102B. In the example where the link between DAS station 102A and DAS station 102B spans exactly 10,000 km, for example, the range of spans associated with repeater 130E 1 to repeater 130E N may cover 9,000 km as an example. The interrogation rate of a return signal 244 derived from the DAS signal 242 will be less than the interrogation rate of first DAS signal 202, and DAS signal 222, as shown in table 1, e.g., 10 Hz, and the maximum sensing frequency is <5 Hz. In the case where the sensing range is from 500 km to 9500 km with respect to DAS station 102A (or the same relative distance from DAS station 102B for that matter), this group of spans may be divided into 90 (100-km-repeater spacing) to 180 (50-km-repeater spacing) sensing spans.

As further depicted in the exemplary embodiment FIG. 4, the sensing wavelength of the DAS signal 242 (λ3) can be blocked from the outbound fiber of the system at the end of 9500 km (furthest of spans 120 from DAS station 102A, such as at loopback '120C N') to boost the inbound (return) loopback signals from the opposite direction. In other embodiments, for simplicity, the sensing wavelength of DAS signal 242 may be retained in the system 100, in the final 500 km (Spans closest to DAS station 102B), since this retention may not unduly affect the inbound loopback signals from the opposite direction.

Based upon the above-described architecture for a DAS system, a method is suggested to significantly improve the measurement sensing sensitivity, due to the loopbacks being provided for both directions for the spans 120C. In particular, by measuring DAS signals from both DAS station 102A and DAS station 102B, and just analyzing the first 50 km of data in each span, the sensitivity can be improved by 20 dB (assuming 0.2 dB/km fiber loss). As an example, a digital signal processing (DSP) analysis algorithm for analysis of the returned DAS signals may be designed to process just the data from the first half of each span (from the EDFA output). For example, the DAS IU sensing capability for a particular span of the spans 120 may cover just the first 50 km for a 100 km span, depending on the DAS IU capabilities. So, in the above example, the system span length can be 50 km for the distance from 0-500 km, and the span length for the remaining part of the system (from 500 km to 9500 km) can be doubled to 100 km. Said differently, because the loopbacks associated with remote repeaters 130E are designed to be bidirectional, each 100 km-length span in the range of 500 km-9500 km can be interrogated in two parts, a 50 km part by DAS IU in DAS station 102A, and a second 50 km part by DAS IU in DAS station 102B. Thus, in this example, instead of providing, e.g., 200 repeaters and loopbacks to sense 10,000 km link with 50 km sensitivity, just 110 repeaters (loopbacks) may be needed in the system of FIG. 4, where the remote repeaters 130E include 90 loopbacks over 9,000 km, and the repeaters 130A-130D collectively include 20 more loopbacks to cover the nearest 500 km from each shore at 50 km span intervals.

Note that the aforementioned embodiments of FIGS. 1-4 and examples of Table I, are provided for the purposes of illustration. According to other embodiments, a DAS sensing system may be designed to have multiple numbers of sensing channels (DAS IU wavelengths) from each end. Each channel may cover a different distance in the DAS system, with an optimized interrogation rate and sensing frequency range. Launching of different DAS IU signals can in addition be time-synchronized and staggered by wavelengths for launching and detection using the synchronization techniques to facilitate proper detection of the different signals.

Moreover, in additional embodiments, a link may be divided into just two types of spans. For example, near shore spans may be probed using loopbacks arranged to direct detection of signals generated by a first IU at a first wavelength and interrogation rate, while intermediate spans may be probed using loopbacks arranged to direct detection of signals generated by a second IU at a second wavelength and second interrogation rate. In the case of two DAS IU in two different stations arranged at opposite ends of a link, a first set of intermediate spans associated with the first station may not overlap with a second set of intermediate spans associated with the second station, such that each DAS IU in the two DAS station probes just the first half of the link closest to that station.

FIG. 5 presents an exemplary process flow 500. At block 502, the operation is performed of launching a first DAS signal from a first DAS IU in a first DAS station at a first interrogation rate and first wavelength. At block 504, the operation is performed of launching a second DAS signal from a second DAS IU in DAS station at a second wavelength, different than the first wavelength, and second interrogation rate, less than first interrogation rate. At block 506 the operation is performed of launching a third DAS signal from a third DAS IU in the DAS station at a third interrogation rate, less than second interrogation rate and at a third wavelength, different from the first wavelength and the second wavelength. At block 508 the operation is performed of routing back the first DAS signal to the DAS station through a particular loopback or a set of proximate loopbacks nearest to the DAS station. At block 510 the operation is performed of routing back the second DAS signal to the DAS station through a particular loopback or a set of intermediate loopbacks, located further from the DAS station. At block 512, the operation is performed of routing back the third DAS signal to the DAS station through a particular loopback or a set of distant loopbacks, located further from the DAS station than the set of intermediate loopbacks.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation, in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full scope and breadth and spirit of the present disclosure as described herein.

What is claimed is:

1. A system for distributed acoustic sensing comprising:
   a first distributed acoustic sensing (DAS) station, comprising a first plurality of interrogator units to launch a first plurality of DAS signals in a first direction,
   wherein a first interrogator unit of the first DAS station is configured to launch a first DAS signal at a first interrogation rate and a first wavelength, wherein a second interrogator unit of the first DAS station is configured to launch a second DAS signal at a second wavelength and a second interrogation rate, less than the first interrogation rate; and
   a loopback array, comprising a plurality of loopbacks, arranged over a plurality of spans,
   wherein a first set of proximate loopbacks nearest to the first DAS station are configured to route back the first DAS signal to the first DAS station, and
   wherein a first set of intermediate loopbacks, located further from the first DAS station, are configured to route back the second DAS signal to the first DAS station.

2. The system of claim 1, wherein the first DAS station is located at a first end of the plurality of spans, the system further comprising:
   a second distributed acoustic sensing (DAS) station, located at a second end of the plurality of spans, further comprising a second plurality of interrogator units to launch a second plurality of DAS signals in a second direction, said second direction being opposite to the first direction,
   wherein a first interrogator unit of the second DAS station is configured to launch a third DAS signal at a third interrogation rate and third wavelength, wherein a second interrogator unit of the second DAS station is configured to launch a fourth DAS signal at a fourth wavelength and a fourth interrogation rate, less than the third interrogation rate;

wherein a second set of proximate loopbacks nearest to the second DAS station are configured to route back the third DAS signal to the second DAS station, and wherein a second set of intermediate loopbacks, located further from the second DAS station, are configured to route back the fourth DAS signal to the second DAS station.

3. The system of claim 1, wherein the first plurality of interrogator units comprises three interrogator units, arranged to launch a set of three DAS signals at three different wavelengths, wherein a third interrogator unit is configured to launch a third DAS signal at a third wavelength and at a third interrogation rate, less than the first interrogation rate, and greater than the second interrogation rate, and wherein a set of distant loopbacks, located further from the first DAS station in comparison to the first set of intermediate loopbacks, are arranged to route back the third DAS signal to the first DAS station.

4. The system of claim 3, wherein the first DAS station is located at a first end of the plurality of spans, the system further comprising:

a second distributed acoustic sensing (DAS) station, located at a second end of the plurality of spans, and comprising an additional set of three interrogator units, wherein a first interrogator unit of the second DAS station is configured to launch a fourth DAS signal in a second direction at a fourth interrogation rate and fourth wavelength, wherein a second interrogator unit of the second DAS station is configured to launch a fifth DAS signal at a fifth wavelength and a fifth interrogation rate, less than the fourth interrogation rate, wherein a third interrogator unit of the second DAS station is configured to launch a sixth DAS signal at a sixth wavelength and a sixth interrogation rate, less than the fifth interrogation rate, the sixth wavelength being different from the third wavelength, wherein a second set of proximate loopbacks nearest to the second DAS station are configured to route back the fourth DAS signal to the second DAS station, wherein a second set of intermediate loopbacks, located further from the second DAS station, are configured to route back the fifth DAS signal to the second DAS station, and wherein the set of distant loopbacks, are configured to route back the sixth DAS signal to the second DAS station.

5. The system of claim 4, wherein the first wavelength is equal to the fourth wavelength, wherein the second wavelength is equal to the fifth wavelength.

6. The system of claim 4, wherein the first interrogation rate is equal to the fourth interrogation rate, wherein the second interrogation rate is equal to the fifth interrogation rate, and wherein the third interrogation rate is equal to the sixth interrogation rate.

7. The system of claim 3, wherein the first interrogation rate is 500 Hz to 2000 Hz, wherein the second interrogation rate is 100 Hz to 400 Hz, and wherein the third interrogation rate is 5 Hz to 20 Hz.

8. The system of claim 1, wherein the first DAS signal and the second DAS signal are launched as a set of pulses, respectively, the system further comprising a controller to synchronize the first DAS signal and the second DAS signal, wherein the first DAS signal is staggered in time from the second DAS signal.

9. The system of claim 1, wherein a given loopback of the plurality of loopbacks comprises:

a circulator;

an erbium-doped fiber amplifier (EDFA); and an optical filter, arranged to filter out just a given wavelength to be routed back to the DAS station, the given wavelength corresponding to the first wavelength or the second wavelength.

10. A system for distributed acoustic sensing comprising:

a first distributed acoustic sensing (DAS) station, located at a first end of a multi-span link, and configured to launch a plurality of DAS signals in a first direction;

a second distributed acoustic sensing (DAS) station, located at a second end of the multi-span link, and configured to launch a plurality of DAS signals in a second direction; and a loopback array, comprising:

a first set of proximate loopbacks, located nearest to the first DAS station;

a first set of intermediate loopbacks;

a second set of proximate loopbacks, located nearest to the second DAS station; and a second set of intermediate loopbacks, located closer to the second DAS station than the first set of intermediate loopbacks, wherein a first wavelength and a first interrogation rate of a first set of DAS signals routed through the first set of proximate loopbacks differs from a second wavelength and a second interrogation rate of a second set of DAS signals routed through the first set of intermediate loopbacks, and wherein a third wavelength and a third interrogation rate of a third set of DAS signals routed through the second set of proximate loopbacks differs from a fourth wavelength and a fourth interrogation rate of a fourth set of DAS signals routed through the second set of intermediate loopbacks.

11. The system of claim 10, wherein the first set and the second set of DAS signals are launched from a first interrogator unit and a second interrogator unit of the first DAS station, respectively, and wherein the third set and the fourth set of DAS signals are launched from a first interrogator unit and a second interrogator unit of the second DAS station, respectively.

12. The system of claim 10, further comprising:

a set of distant loopbacks, located further from the first DAS station than the first set of intermediate loopbacks, and located further from the second DAS station than the second set of intermediate loopbacks, wherein a fifth wavelength and a fifth interrogation rate of a fifth set of DAS signals routed from the first DAS station through the set of distant loopbacks is different from the first wavelength and the first interrogation rate and different from the second wavelength and the second interrogation rate, wherein a sixth wavelength and a sixth interrogation rate of a sixth set of DAS signals routed from the second DAS station through the set of distant loopbacks is different from the third wavelength and the third interrogation rate and different from the fourth wavelength and the fourth interrogation rate, and wherein the sixth wavelength is different from the fifth wavelength.

13. The system of claim 12, wherein the first wavelength is equal to the third wavelength, wherein the second wavelength is equal to the fourth wavelength.

14. The system of claim 12, wherein the first interrogation rate is equal to the third interrogation rate, wherein the second interrogation rate is equal to the fourth interrogation rate, and wherein the fifth interrogation rate is equal to the sixth interrogation rate.

15. The system of claim 12, wherein the first interrogation rate and third interrogation rate lie between 500 Hz to 2000 Hz, wherein the second interrogation rate and fourth interrogation rate lie between 100 Hz to 400 Hz, and wherein the fifth interrogation rate and sixth interrogation rate lie between 5 Hz to 20 Hz.

16. The system of claim 10, wherein the first set, the second set, the third set, and the fourth set of DAS signals are launched as a set of pulses, respectively, the system further comprising a controller arrangement to:

synchronize the first set of DAS signals and the second set of DAS signals, wherein the first set of DAS signals are staggered in time from the second set of DAS signals from one station; and synchronize the third set of DAS signals and the fourth set of DAS signals, wherein the third set of DAS signals are staggered in time from the fourth set of DAS signals from another station.

17. A method for distributed acoustic sensing comprising:

launching a first DAS signal from a first interrogator unit of a first DAS station at a first interrogation rate and a first wavelength;

launching a second DAS signal from a second interrogator unit of the first DAS station at a second wavelength and a second interrogation rate, less than the first interrogation rate;

routing back the first DAS signal to the first DAS station through a loopback of a first set of proximate loopbacks nearest to the first DAS station; and routing back the second DAS signal to the first DAS station through a loopback of a first set of intermediate loopbacks, located further from the first DAS station.

18. The method of claim 17, further comprising:

launching a third DAS signal from a third interrogator unit of the first DAS station at a third interrogation rate, less than the second interrogation rate, and a third wavelength; and routing back the third DAS signal to the first DAS station through a loopback of a set of distant loopbacks, located further from the first DAS station than the first set of intermediate loopbacks.

19. The method of claim 18, wherein the first DAS signal, the second DAS signal, and the third DAS signal are formed of a set of pulses, a second set of pulses, and a third set of pulses, respectively, wherein the first set of pulses is staggered in time with respect to the second set of pulses and the third set of pulses, and wherein the second set of pulses is staggered in time with respect to the third set of pulses.

20. The method of claim 17, wherein the first DAS signal is launched over a system comprising a plurality of spans, the method further comprising:

employing an analysis algorithm to sense just a portion of the first DAS signal that is returned from just a first half of a given span of the plurality of spans.

\* \* \* \* \*